Feb. 5, 1963 F. W. WITTE ET AL 3,076,934
PERMANENT MAGNET DAMPING ASSEMBLY FOR INTEGRATING METERS
Original Filed June 16, 1954
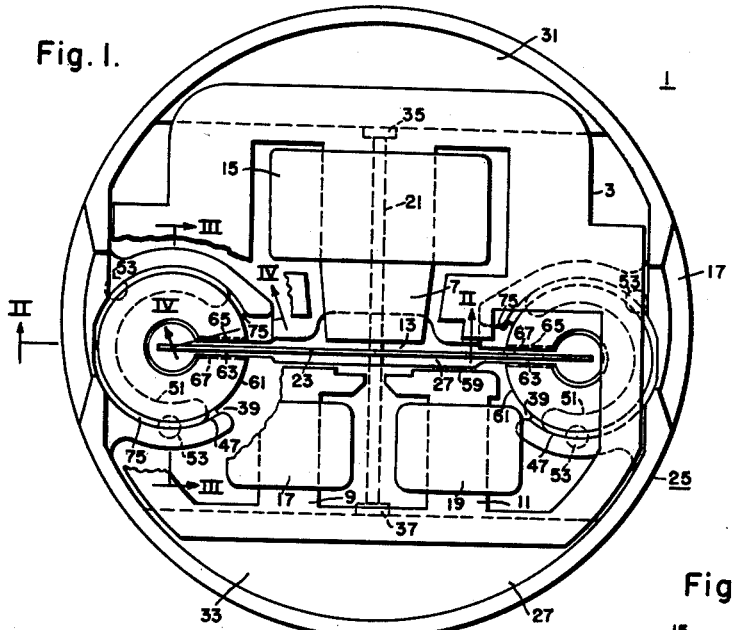
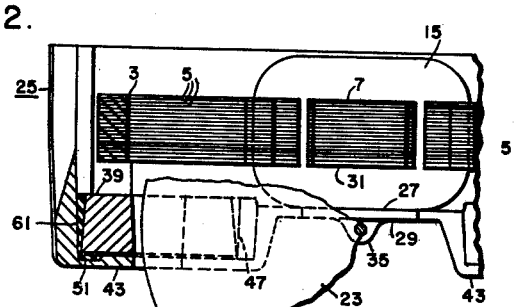
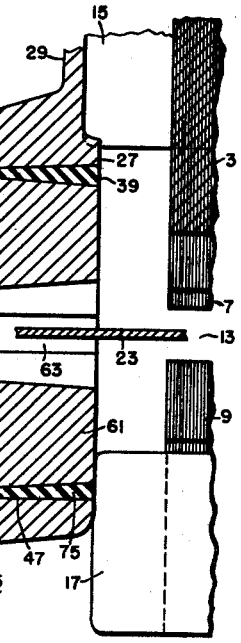
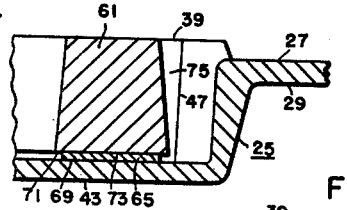
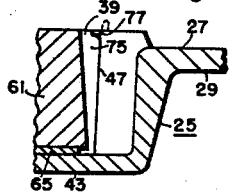
INVENTORS
Frederick W. Witte &
John J. Loughran.
BY
David M. Schiller
ATTORNEY

United States Patent Office 3,076,934
Patented Feb. 5, 1963

3,076,934
PERMANENT MAGNET DAMPING ASSEMBLY FOR INTEGRATING METERS
Frederick W. Witte, Union, N.J., and John J. Loughran, Pottstown, Pa., assignors to Westinghouse Electric Corporation, East Pittsburgh, Pa., a corporation of Pennsylvania
Original application June 16, 1954, Ser. No. 437,030. Divided and this application June 24, 1957, Ser. No. 667,634
4 Claims. (Cl. 324—152)

This invention relates to permanent magnet assemblies and has particular relation to permanent magnet damping assemblies suitable for damping rotation of rotor assemblies of electrical devices.

This application is a divisional application of application Serial No. 437,030, filed June 16, 1954, by F. W. Witte and assigned to the Westinghouse Electric Corporation.

Permanent magnet assemblies are widely employed in the art for purposes of damping movement or rotation of the moving elements of various devices, such as relays, ammeters, voltmeters and wattmeters. For purposes of discussion, however, the present invention will be described with reference to permanent magnet assemblies employed in connection with integrating watthour meters for purposes of damping rotation of the rotor assemblies of such watthour meters.

Such a permanent magnet assembly may comprise one or more permanent magnets constructed of suitable high coercive magnetic material. Preferably, a pair of permanent magnets are provided with each magnet having a substantially C-shaped configuration with a pair of opposed poles defining an air gap. The magnets are conveniently mounted adjacent opposite edges of an electroconductive disc forming part of the rotor structure of a watthour meter. With such positioning of the magnets, portions of the disc pass through the air gaps of the magnets during rotation of the disc.

The permanent magnets are conveniently secured in operative positions to a suitable frame member which is proportioned to support certain other operating components of the meter, such as the electromagnetic stator structure and the rotor structure which include the electroconductive disc. The frame may be constructed of any suitable material. Conveniently, the frame is a die-cast from an electroconductive non-magnetic die-casting material with suitable spaced pockets of the frame being formed during the die-casting operation for receiving the permanent magnets.

The present invention provides securing means for securing the magnets to the frame within the pockets. In accordance with a specific embodiment of the invention, the securing means comprises a hardenable fluid material which is introduced into the pockets subsequent to the mounting and positioning of the magnets within the pockets for rigidly securing the magnets to the frame.

With such arrangement the magnets are conveniently premagnetized prior to the insertion thereof into the pockets. Preferably, the securing material is selected to have a melting temperature sufficiently low to prevent alteration of the magnetic properties of the magnets during assembly thereof.

Temperature compensating means in the form of C-shaped magnetic shunts may be associated with the magnets for the purpose of assuring a substantially constant damping effect over a wide range of temperatures. Conveniently, the shunts are secured in operative positions relative to the magnets within the pockets during the same operation by which the magnets are secured within the pockets.

The invention further provides locking means for preventing accidental relative displacement between the hardened securing material and the supporting frame. The locking means comprises integral portions of the frame positioned and proportioned to engage the securing material to lock the material within the pockets.

It is, therefore, an object of the invention to provide an improved permanent magnet assembly.

It is another object of the invention to provide a permanent magnet assembly including a plurality of parts which are readily asembled and disassembled relative to one another.

It is a further object of the invention to provide a permanent magnet assembly including a permanent magnet and a temperature compensating magnetic shunt secured within a preformed pocket of a supporting frame by a hardenable fluid material.

It is still another object of the invention to provide a permanent magnet assembly including a C-shaped permanent magnet secured within a preformed pocket of a supporting frame by a hardenable fluid material having a relatively low melting temperature to thereby prevent alteration of the magnetic properties of the magnet during assembly of the magnet relative to the frame.

It is a further object of the invention to provide an assembly as defined in the preceding paragraph wherein the C-shaped magnet is positioned within the pocket by movement of the magnet relative to the frame along an axis transverse to the plane of the magnet.

It is a still further object of the invention to provide a permanent magnet assembly for an integrating watthour meter including a permanent magnet secured within a pocket formed in a die-cast electroconductive frame by a hardenable fluid material with the frame being proportioned to support an electromagnetic structure of the meter with the electromagnetic structure extending across the open end of the pocket.

It is still another object of the invention to provide a permanent magnet assembly including a permanent magnet secured to a supporting frame by a hardenable fluid material with means for preventing relative displacement between the hardened material and the frame member.

It is a further object of the invention to provide an improved method of assembling a permanent magnet assembly relative to a supporting frame member.

Other objects of the invention will be apparent from the following description taken in conjunction with the accompanying drawings, in which:

FIG. 1 is a view in rear elevation with parts broken away of an integrating watthour meter embodying the invention;

FIG. 2 is a view in section taken along the line II—II of FIG. 1;

FIG. 3 is a view in section taken along the line III—III of FIG. 1;

FIG. 4 is a view in section taken along the line IV—IV of FIG. 1; and

FIG. 5 is a view similar to FIG. 4 showing a further embodiment of the invention.

Referring to the drawings, there is illustrated in FIG. 1 an electrical device 1 embodying the invention. For purposes of discussion, it will be assumed that the device 1 comprises an integrating watthour meter, although the invention is applicable to other devices, such as relays, etc.

The meter 1 includes an electromagnetic stator structure including a magnetic structure 3 preferably constructed of a plurality of magnetically-soft stacked magnetic laminations 5, each having the configuration shown in FIG. 1. The laminations 5 may be secured together in any suitable manner to provide the magnetic structure 3. The structure 3 includes a single voltage magnetic pole 7 and a pair of spaced current magnetic poles 9 and 11. The voltage pole 7 has a pole face which is spaced from the pole faces of the current poles 9 and 11 to provide an air gap 13.

The voltage pole 7 is provided with a voltage winding 15 and the current poles 9 and 11 are provided respectively with current windings 17 and 19. The windings 15, 17 and 19 are effective when energized in accordance with alternating quantities to establish a shifting magnetic field in the air gap 13 for influencing an associated rotor assembly. The rotor assembly includes a shaft 21 and an electroconductive disc 23 mounted on the shaft 21 for rotation through the air gap 13. Further details of the construction of watthour meters of the type described may be obtained by reference to U.S. Patent No. 2,512,345, issued to R. N. Leippe.

The present invention provides a supporting frame member for supporting certain operating parts of the meter. With reference to FIG. 1, there is illustrated a frame 25 which may be constructed of any suitable material. Preferably, the frame 25 is constructed of a non-magnetic, electroconductive die-casting material, such as an aluminum die-casting alloy, which may be cast to provide a frame of the desired configuration. Such die-casting material, being electroconductive, offers shielding against external alternating electromagnetic fields. Inasmuch as the frame may be cast separately, a material may be employed having a substantial melting temperature, such as a temperature of the order of 500° C. or higher. The material thus may be selected to provide desired properties such as physical, electrical and chemical properties without fear that the temperatures required will interfere with other operations or components. The melting temperature of a suitable aluminum-base die-casting material is approximately 600° C.

The frame 25 is formed with a pair of opposing sides 27 and 29 with the side 27 having projecting spaced surfaces 31 and 33 lying in a common plane for a purpose appearing hereinafter. During the die-casting operation, the frame 25 is conveniently provided with a pair of spaced bearing members 35 and 37 which are positioned on the side 29 of the frame and which are proportional to support the shaft 21 and the disc 23 for rotation as will presently appear.

The frame 25 is further provided with one or more pockets 39 for accommodating a permanent magnet assembly as will presently appear. Preferably, the frame 25 is formed with a pair of spaced pockets 39 arranged substantially symmetrically relative to the axis of rotation of the shaft 21. Each of the pockets extends from the side 27 of the frame downwardly as viewed in FIG. 2, and is provided with an end wall 43 formed by a portion of the frame, and a side wall 47. As illustrated in FIG. 2, each of the end walls 43 is spaced downwardly from the open end of the pocket and is provided with an annular recess 51 which communicates with the associated pocket.

Each of the end walls 43 is provided with one or more openings 53 positioned to communicate with the annular recess 51. In a preferred embodiment of the invention each of the end walls is provided with a pair of openings 53 proportional to form a pair of recesses 55 of each of the pockets 39. As best shown in FIG. 3 each of the recesses 55 defines a surface 57 of the associated pocket with the surfaces 57 extending substantially transverse to the surfaces of the side walls 47 of the pockets. The purposes of the surfaces 57 will be explained more fully hereinafter. Conveniently, the pockets, recesses and openings 39, 51, and 53 all may be formed in the frame 25 during the die-casting operation.

As best shown in FIG. 1, the frame 25 is provided with an elongated slot 59 which extends entirely through the frame 25. The slot 59 is conveniently formed in the frame during the die-casting operation and is proportioned to communicate with each of the pockets 39 through the side walls 47 and through portions of the end walls 43 of the pockets. It will be recalled that spaced bearings 35 and 37 are provided on the side 29 of the frame 25. The bearings 35 and 37 are proportioned to mount the shaft 21 and the disc 23 to position the disc 23 for rotation through the slot 59. The slot 59 is proportioned to provide small vertical clearance to permit passage of the disc 23 through the slot.

The frame 25 is proportioned with the magnetic structure 3 on the side 27 of the frame to position the air gap 13 of the magnetic structure 3 substantially in alignment with the slot 59 as illustrated in FIG. 1. With such arrangement, portions of the magnetic structure 3 engage the projecting surfaces 31 and 33 of the side 27 of the frame with the windings 15, 17 and 19 being received in a channel of the side 27 formed intermediate the surfaces 31 and 33. The magnetic structure 3 may be secured to the surfaces 31 and 33 of the frame in any desired manner. As shown in FIGS. 1 and 2, the magnetic structure 3 extends across the open ends of the pockets 39 to cooperate with the frame 25 for offering shielding of the magnets 61 against external alternating electromagnetic fields. The relative position of the magnetic structure 3, the slot 59 and the disc 23 are best shown by reference to FIGS. 1 and 2. As shown in FIG. 1, the disc 23 is mounted for rotation through the slot 59 and the air gap 13 of the magnetic structure 3 under the influence of the electromagnetic structure. The disc 23 is proportioned to have portions thereof pass through the pockets 39 during rotation of the disc.

In order to damp rotation of the disc 23, a permanent magnet assembly is provided which may comprise one or more permanent magnets positioned to influence the disc 23. Preferably, a pair of permanent magnets 61 is provided with the magnets 61 being positioned at spaced points adjacent opposing edges of the disc 23 for influencing the disc. Each of the magnets 61 preferably is of substantially C-shaped configuration having a pair of spaced poles defining an air gap 63.

The magnets 61 may be constructed of any suitable magnetic material. Preferably, the magnets 61 are constructed of a high coercive magnetic material a number of which are presently available. For example, high-cobalt permanent magnet steel, such as one containing 36% by weight of cobalt is available. In a preferred embodiment of the invention, a high coercive alloy known as Alnico is employed. A number of high-coercive permanent magnet materials are listed in a pamphlet entitled Nickel Containing Alloys for Permanent Magnets published in 1949 by the International Nickel Company, Inc., New York City. Such high coercive alloys provide compact permanent magnets and have good resistance to demagnetization. Alnico V and Alnico VI alloys are very suitable. To illustrate suitable proportions, such as Alnico damping magnet may have an outer diameter of the order of 1⅛ inches, a thickness of the order of ½ inch and an air gap of the order of ⅛ inch long.

Suitable temperature compensating means may be associated with one or both of the magnets 61 for the purpose of providing a substantially constant damping effect over a wide range of temperature. In the specific embodiment of FIG. 1, a pair of magnetic members or shunts 65 is provided each having a substantially C-shaped configuration defining an air gap 67. As will presently appear, each of the shunts 65 is associated with a separate one of the magnets 61 with corresponding side faces of the associated magnet and shunt in engagement to position the air gaps 63 and 67 in alignment. With such arrangement, the shunts 65 are effective to shunt magnetic flux away from the air gaps 63 of the associated magnets 61. As is understood in the art, the shunts 65 may be constructed of a material having a negative temperature coefficient of permeability. For example, the shunts may be constructed of a nickel-iron alloy containing approximately 30% nickel.

In the past, a number of arrangements have been employed for mounting permanent magnets relative to rotor structures. According to one known arrangement, a pair of C-shaped magnets are die-cast with and embedded in a die-casting support frame. With such arrangement it is necessary to perform the required machining operations on the frame with the magnets embedded within the frame. Consequently, in order to avoid damage to the permanent magnets such machining operations must be effected with great care. Furthermore, such arrangement of the magnets and the supporting frame may result in considerable waste of expensive parts inasmuch as faulty machining of the frame requires disposal of both the frame and the associated magnets by reason of the permanent nature of the mounting arrangement. During the die-casting operation of the above-described prior art arrangement, relatively high temperature and pressure conditions are encountered which may result in damage to the permanent magnets.

According to the above-described prior art arrangement, temperature compensating magnetic shunts are permanently secured to the magnets prior to the die-casting operation, thereby requiring two distinct operations involving the securement of the shunts to the magnets and the subsequent die-casting of the assembled shunts and magnets with the frame.

In acordance with the teachings of the present invention, the magnets 61 and the shunts 65 are secured to each other and to a performed frame member in a single operation to provide a rigid structure. The invention further permits all machining operations to be performed upon the frame prior to the assembly of the magnets relative to the frame. The present invention further provides securing means for rigidly securing the magnets and the associated shunts in operative positions to the frame.

It will be recalled that pockets 39 are formed in the frame 25 during the die-casting operation. The pockets 39 are proportioned and positioned to receive the magnets 61 and the associated shunts 65 to mount the magnets and shunts in operative positions relative to the frame 25. Although a pair of pockets 39 are provided for accommodating a pair of magnets 61, a single pocket may be provided if it is desired to utilize a single permanent magnet to effect damping of the associated rotor assembly.

According to the present invention securing means are provided for securing the magnets 61 and the shunts 65 to the frame 25 within the pockets 39. In a preferred embodiment of the invention the securing means is in the form of a hardenable fluid material which is conveniently introduced into each of the pockets 39 through one of the associated openings 53 as by a die-casting operation to engage the magnets 61, the shunts 65 and the frame 25. The invention further provides that the fluid material be selected to have a melting temperature sufficiently low so as to prevent alteration of the magnetic properties of the magnets 61 during assembly of the magnets to the frame. The method of assembling the magnets 61 and the shunts 65 relative to the frame 25 will now be described.

Prior to assembly of the magnets 61 and the shunts 65 relative to the frame 25, the frame 25 is machined and cleaned to provide a finished frame member. Such operations assure that the slot 59 is clear of all foreign particles and that the frame member is properly proportioned to receive the operating parts of the meter. If desired, the magnets 61 may be treated and magnetized to a final magnetic condition prior to assembly thereof relative to the frame. After the above operations have been carried out, the magnets 61, the shunts 65 and the frame 25 are located in a suitable fixture assembly (not shown) in order to properly position the parts relative to each other.

A separate one of the shunts 65 is positioned within each of the pockets 39 with the side faces 69 of the shunts in engagement with the end walls 43 of the associated pockets. Each of the magnets 61 is located within a separate one of the pockets 39 with the side faces 71 of the magnets in engagement with the side faces 73 of the associated shunts. The associated magnets and shunts are positioned with the air gaps 63 and 67 thereof substantially in alignment.

The pockets 39 are proportioned to receive the associated magnets and shunts through the open ends thereof by movement of the magnets and shunts relative to the frame in a direction transverse to the end walls 43 while keeping the magnets and shunts parallel to their mounted positions. The pockets are further proportioned to receive the magnets and shunts in the manner described with clearance to permit positioning of the magnets and shunts with annular gaps between the peripheral surfaces thereof and the side walls 47 of the pockets, as best shown in FIGS. 1 and 2. The pockets are positioned so that the aligned air gaps 63 and 67 of the associated magnets and shunts are substantially in alignment with the slot 59 and the air gap 13 of the magnetic structure 3 when the magnets and shunts are properly located within the pockets. In addition, the pockets are positioned to receive the magnets with the magnets lying in a plane which includes, or which is adjacent to, the axis of the shaft 21.

With the magnets, shunt and frame positioned relative to each other in the manner described, a hardenable fluid material 75 is introduced into the space between the permanent magnets and the frame and allowed to solidify. Preferably, the fluid 75 is confined substantially to a C-shaped configuration terminating short of the ends of the permanent magnets as shown in the drawing. The cavity for receiving the fluid 75 may be temporarily closed in any suitable manner as by pressing resilient material (not shown) into engagement with the magnets and frame. The hardenable fluid material, represented by the numeral 75, is then introduced into the pockets or cavities through any suitable openings such as the openings 53 to substantially fill the annular gaps between the peripheral surfaces of the magnets and shunts and the side walls of the associated pockets. The material 75 is positioned externally of the slot 59 and the central openings of the magnets and shunts to permit passage of the disc 23 through the slot 59 and the air gaps 63. The material also fills the annular recesses 51 of the pockets and the openings 53 of the end walls 43. Such material is conveniently introduced into the pockets 39 as by a die-casting operation. The fluid material 75 is then allowed to harden with the result that the associated magnets and shunts become rigidly secured to each other and to the frame within the pockets.

The material 75 may comprise any suitable hardenable fluid material, such as a plastic cement or adhesive, but preferably is a metallic alloy, such as babbit metal, which is capable of securing the magnets 61 to the frame 25 upon setting. In accordance with a preferred embodiment of the invention, the material 75 is selected to have a melting temperature sufficiently low so as to prevent alteration of the magnetic properties of the magnets 61 during assembly thereof to the frame. For example, materials having melting temperatures of less than 250° C. may be employed.

During the die-casting of the frame 25 the side walls 47 of the pockets 39 are provided with a slope between the end walls and the open ends thereof to provide enlarged open ends as shown in FIG. 3. It is also observed with reference to FIG. 3 that the peripheral surfaces of the magnets 61 taper toward a side face thereof, and that the magnets 61 are positioned within the pockets 39 to have the peripheral surfaces taper in directions toward the side 27 of the frame.

After the fluid material 75 sets, it is possible that the hardened material may subsequently become accidentally detached or loosened from either the frame 25 or the peripheral surfaces of the magnets 61 or from both. If for some reason the material becomes detached from the peripheral surfaces of the magnets, the magnets will still be firmly retained within the pockets since relative displacement between the material and the magnets in directions extending toward the open ends of the pockets is prevented by engagement of the tapered surfaces of the material and the magnets. However, if the material eventually becomes detached from the end walls and side walls of the pockets, the material together with the magnets 61 are free for displacement relative to the frame 25 in directions extending toward the open ends of the pockets.

In order to prevent such accidental displacement of the magnets 61 relative to the frame 25 means are provided in accordance with the invention for securing the hardened material 75 against displacement relative to the frame 25 in directions extending toward the open ends of the pockets. It will be recalled that each of the end walls 43 of the pockets 39 is provided with a pair of openings 53 proportioned to define surfaces 57 of the associated side wall with the surfaces 57 extending substantially transverse to the direction of extension of the pockets 39. When the fluid material 75 is introduced into the pockets 39, the material substantially fills the openings 53 and the recesses 55 to engage the surfaces 57. By reason of the surfaces 57 accidental detachment of the material from the frame 25 is ineffective to free the hardened material for displacement relative to the frame in directions extending toward the open ends of the pockets.

With reference to FIG. 5, there is illustrated a further embodiment of the invention wherein accidental relative displacement between the frame and the hardened material is prevented. In the embodiment of FIG. 5 the frame 25 is provided with a pair of projections 77 each positioned to extend partially across a separate one of the open ends of the pockets. When the fluid material 75 is introduced into the pockets 39, the material fills the annular gaps within the pockets to engage the projections 77. Conveniently, the projections 77 are formed during the die-casting of the frame 25 to extend along axes parallel the axes of extension of the pockets, as illustrated in dotted lines in FIG. 5. Each of the projections may then be deformed to assume the position as shown in FIG. 5.

For certain purposes, it may be desired to release the magnets 61 from the frame 25 for permitting withdrawal of the magnets from the associated pockets. By means of the invention, the magnets are conveniently detached from the frame by the application of heat to the hardened securing material 75 sufficient to melt the material. The present invention also permits the release of the magnets from the frame by forced detachment of the hardened material 75 from the frame. This is conveniently accomplished by striking the hardened material 75 with a suitable tool at the openings 53 of the end walls of the pockets to effect disengagement of the hardened material from the frame and to force the permanent magnet out of the pocket. The portion of the material 75 in the opening 53 constitutes in effect a rivet head and may be broken off from the remainder of the material as the magnet is driven out of the pocket.

Although the invention has been described as contemplating the provision of a pair of permanent magnets 61 of identical configuration, and a pair of pockets 39 arranged symmetrically relative to the axis of the shaft 21, it is to be understood that magnets 61 may be employed having different configurations, and that pockets 39 may be provided with configurations for accommodating magnets of different shapes.

By reason of the present invention, a rigid and compact damping assembly is provided. The invention further assures against waste of expensive parts in that the frame and magnets may be treated independently of each other, and may be assembled relative to each other in a manner permitting ready disassembly thereof. Furthermore, the magnets conveniently may be premagnetized prior to assembly thereof relative to the frame. In addition, the frame may be completely machined and cleaned prior to the mounting of the magnets to the frame. The magnets are secured to the frame in an efficient and inexpensive manner which assures against displacement of the magnets relative to the frame.

Although the invention has been described with reference to certain specific embodiments thereof, numerous modificaitons are possible, and it is desired to cover all modifications falling within the spirit and scope of the invention.

We claim as our invention:

1. In a watthour meter of the disc type, in combination, a thin walled frame casting including a vertical wall having a horizontal slot therein to freely receive the disc, said wall having a relatively deep pocket cast therein at one end of said slot, a roughly C-shaped permanent magnet assembly in said pocket and oriented to straddle the edge of the disc, said assembly including a relatively thick permanent magnet and a superimposed thinner temperature compensator having a negative temperature coefficient of permeability, the pocket having a flat bottom wall engaging a portion of the bottom of said assembly, the pocket side walls flaring outwardly from the periphery of said bottom wall, the bottom wall having spaced holes therethrough, and a unitary filling of cast material in the space between the magnet assembly and pocket walls and extending through the said holes to secure the assembly in said pocket.

2. In a watthour meter of the disc type, in combination, a thin walled frame casting including a vertical wall having a horizontal slot therein a freely receive the disc, said wall having a relatively deep pocket cast therein at one end of said slot, a roughly C-shaped permanent magnet in said pocket and oriented to straddle the edge of the disc, the pocket having a flat bottom wall adjacent a portion of the bottom of said magnet, the pocket side walls flaring outwardly from the periphery of said bottom wall, the bottom wall having spaced holes therethrough, and a unitary filling of cast material in the space between the magnet and pocket walls and extending through the said holes to secure the magnet in said pocket.

3. In a watthour meter of the disc type, in combination, a thin walled frame casting including a vertical wall having a horizontal slot therein to freely receive the disc, said wall having a relatively deep pocket cast therein at one end of said slot, a roughly C-shaped permanent magnet assembly in said pocket and oriented to straddle the edge of the disc, said assembly including a relatively thick permanent magnet and a superimposed thinner temperature compensator having a negative temperature coefficient of permeability, the pocket having a flat bottom wall and a side wall, said bottom wall having a hole extending therethrough, said hole having an axis substantially passing through the intersection of said bottom wall and side wall, and a unitary filling of cast material in the space between the magnet assembly and pocket walls and extending through the said hole to secure the assembly in said pocket.

4. In a magnetic damping assembly for damping rotation of an induction disc, a frame having a pocket with an open end, a bottom wall and a side wall, a permanent magnet of substantially C-shaped configuration having opposing C-shaped sides, said magnet having a peripheral surface between said sides which tapers from one side toward the other side, said pocket being proportioned to receive said magnet through the open end, said magnet being positioned within said pocket with the peripheral surface spaced from said side wall tapering toward said pocket open end, said bottom wall having a pair of spaced holes extending therethrough, each of said holes having a center point on a line substantially parallel to and adjacent the pocket side wall, and a heat-meltable solid material in the space between the magnet and side wall filling said holes to secure the magnet in said pocket.

References Cited in the file of this patent

UNITED STATES PATENTS

| | | |
|---|---|---|
| 600,751 | Streeter | Mar. 15, 1898 |
| 702,590 | Reynolds | June 17, 1902 |
| 1,590,392 | Peters | June 29, 1926 |
| 2,623,254 | Proctor | Dec. 30, 1952 |
| 2,668,275 | Goss | Feb. 2, 1954 |
| 2,879,478 | Riesz | Mar. 24, 1959 |

FOREIGN PATENTS

| | | |
|---|---|---|
| 453,262 | Great Britain | Sept. 8, 1936 |